(12) United States Patent
Madison et al.

(10) Patent No.: US 12,514,149 B2
(45) Date of Patent: Jan. 6, 2026

(54) SYSTEMS AND METHODS FOR SPRAYING SEEDS DISPENSED FROM A HIGH-SPEED PLANTER

(71) Applicant: Capstan Ag Systems, Inc., Topeka, KS (US)

(72) Inventors: Adam Madison, Lancaster, KS (US); Anthony Moeder, Topeka, KS (US)

(73) Assignee: Capstan Ag Systems, Inc., Topeka, KS (US)

( * ) Notice: Subject to any disclaimer, the term of this patent is extended or adjusted under 35 U.S.C. 154(b) by 622 days.

(21) Appl. No.: 18/146,040

(22) Filed: Dec. 23, 2022

(65) Prior Publication Data

US 2023/0138141 A1  May 4, 2023

Related U.S. Application Data

(63) Continuation of application No. 16/823,460, filed on Mar. 19, 2020, now Pat. No. 11,533,837.
(Continued)

(51) Int. Cl.
*A01C 7/06* (2006.01)
*A01C 7/10* (2006.01)
(Continued)

(52) U.S. Cl.
CPC .......... *A01C 7/06* (2013.01); *A01C 7/105* (2013.01); *A01C 7/206* (2013.01); *A01C 23/007* (2013.01); *A01C 23/047* (2013.01)

(58) Field of Classification Search
CPC ........... A01C 7/06; A01C 7/105; A01C 7/206; A01C 23/007; A01C 23/047
See application file for complete search history.

(56) References Cited

U.S. PATENT DOCUMENTS

| 3,322,080 A | 5/1967 | Gatzke |
| 3,373,705 A | 3/1968 | Hansen |

(Continued)

FOREIGN PATENT DOCUMENTS

| WO | 2014018717 A1 | 1/2014 |
| WO | 2019067933 A1 | 4/2019 |

OTHER PUBLICATIONS

Curley, Robert G., et al., "Planter Attachment for the Spot Application of Soil Anticrustant," Paper No. 91-1013, ASAE Meeting Presentation, Jun. 23-26, 1991, Albuquerque, New Mexico, 11 pgs.
(Continued)

*Primary Examiner* — Wade Miles
*Assistant Examiner* — Jaewook Jung
(74) *Attorney, Agent, or Firm* — Armstrong Teasdale LLP

(57) ABSTRACT

A planter system for planting seeds and spraying fluid includes a seeder assembly including a seed tube and a conveyor apparatus configured to propel or carry the seed through the seed tube. The planter system also includes a sensor configured to transmit a detection signal upon detection of the seed passing a detection location. The planter system also includes a control system configured to determine a travel time of the seed from the detection location to a furrow based on a baseline drop time for the seed, a baseline travel speed of the seeder assembly, and an operating travel speed of the seeder assembly. The control system is configured to transmit a control signal to a valve coupled to a nozzle assembly based on the travel time and the detection signal to spray the fluid on or adjacent the seed.

12 Claims, 7 Drawing Sheets

Related U.S. Application Data

(60) Provisional application No. 62/822,403, filed on Mar. 22, 2019.

(51) Int. Cl.
  A01C 7/20 (2006.01)
  A01C 23/00 (2006.01)
  A01C 23/04 (2006.01)

(56) References Cited

U.S. PATENT DOCUMENTS

| | | | |
|---|---|---|---|
| 3,450,074 | A | 6/1969 | Gatzke |
| 4,220,998 | A | 9/1980 | Kays |
| RE31,023 | E | 9/1982 | Hall, III |
| 4,448,820 | A | 5/1984 | Buschor |
| 4,561,565 | A | 12/1985 | Wolf |
| 4,765,263 | A | 8/1988 | Wilkins |
| 4,915,258 | A | 4/1990 | Olson |
| 5,024,173 | A | 6/1991 | Deckler |
| 5,134,961 | A | 8/1992 | Giles |
| 5,170,909 | A | 12/1992 | Lundie |
| 5,379,812 | A | 1/1995 | McCunn |
| 5,475,614 | A | 12/1995 | Tofte |
| 5,632,212 | A | 5/1997 | Barry |
| 5,650,609 | A | 7/1997 | Mertins |
| 5,653,389 | A | 8/1997 | Henderson |
| 5,704,546 | A | 1/1998 | Henderson |
| 5,744,793 | A | 4/1998 | Skell |
| 5,847,389 | A | 12/1998 | Mertins |
| 5,848,571 | A | 12/1998 | Stufflebeam |
| 5,924,371 | A | 7/1999 | Flamme |
| 6,047,652 | A | 4/2000 | Prairie |
| 6,070,539 | A | 6/2000 | Flamme |
| 6,081,224 | A | 6/2000 | Rosenbrock |
| 6,216,615 | B1 | 4/2001 | Romans |
| 6,273,010 | B1 | 8/2001 | Luxon |
| 6,289,829 | B1 | 9/2001 | Fish |
| 6,453,832 | B1 | 9/2002 | Schaffert |
| 6,477,967 | B2 | 11/2002 | Rosenboom |
| 6,481,647 | B1 | 11/2002 | Keaton |
| 6,516,733 | B1 | 2/2003 | Sauder |
| 6,763,773 | B2 | 7/2004 | Schaffert |
| 6,834,749 | B1 | 12/2004 | Johnson |
| 7,273,016 | B2 | 9/2007 | Landphair |
| 7,370,589 | B2 | 5/2008 | Wilkerson |
| 7,717,048 | B2 | 5/2010 | Peterson, Jr. |
| 7,868,242 | B2 | 1/2011 | Takahashi |
| 8,074,585 | B2 | 12/2011 | Wilkerson |
| 8,191,795 | B2 | 6/2012 | Grimm |
| 8,523,085 | B2 | 9/2013 | Grimm |
| 9,226,442 | B2 | 1/2016 | Grimm |
| 9,629,313 | B1 | 4/2017 | Grossman |
| 9,706,702 | B2 | 7/2017 | Wendte |
| 10,058,023 | B2 | 8/2018 | Conrad |
| 2004/0231575 | A1 | 11/2004 | Wilkerson |
| 2006/0273189 | A1 | 12/2006 | Grimm |
| 2007/0193482 | A1 | 8/2007 | Spooner |
| 2012/0228395 | A1 | 9/2012 | Needham |
| 2013/0269578 | A1 | 10/2013 | Grimm |
| 2014/0299673 | A1 | 10/2014 | Grimm |
| 2016/0015020 | A1 | 1/2016 | Needham |
| 2016/0073576 | A1 | 3/2016 | Grimm |
| 2016/0316613 | A1 | 11/2016 | Burk |
| 2017/0086351 | A1 | 3/2017 | Garner |
| 2019/0029167 | A1 | 1/2019 | Weigel |
| 2019/0059204 | A1 | 2/2019 | Kowalchuk |
| 2020/0000012 | A1 | 1/2020 | Hubner |
| 2021/0084807 | A1 | 3/2021 | Obrist |

OTHER PUBLICATIONS

Hancock, John. A., "Design and Evaluation of a Seed-Specific Applicator if In-Furrow Chemical Application," A Thesis Presented for the Master of Science Degree, University of Tennessee, Knoxville, May 2003, 172 pgs.

Chidiu, G. M. et al., "A New Method of Soil Application of Aldicarb," Published in J. Prod. Agric. 8:43-45(1) (1995), 3 pgs.

Lohmeyer, K. H. et al., "Precision Application of Aldicarb to Enhance Efficiency of Thrips (Thysanoptera: Thripidae) Management in Cotton," Journal of Economic Entomology, 96(3):748-754. 2003, Published by the Entomological Society of America, 8 pgs.

SYSTEMS AND METHODS FOR SPRAYING SEEDS DISPENSED FROM A HIGH-SPEED PLANTER

CROSS-REFERENCE TO RELATED APPLICATIONS

This application is a continuation of U.S. patent application Ser. No. 16/823,460, filed Mar. 19, 2020, which claims priority to U.S. Provisional Patent Application Ser. No. 62/822,403, filed on Mar. 22, 2019, the disclosures of which are hereby incorporated by reference in their entirety.

BACKGROUND

The field of this disclosure relates generally to systems for applying fluid to agricultural fields and, more particularly, to systems and methods for spraying seeds dispensed from a high-speed planter.

In the agricultural industry, agricultural fluids are commonly applied to fields for a variety of reasons. For example, plants and plant precursors (e.g., seeds) are often sprayed with an agricultural fluid at the time of planting to enhance germination and early development. Agricultural fluids include, without limitation, spray fertilizers, pesticides, insecticides, fungicides, growth promoter, and/or growth regulator.

To simplify this process, various spraying systems have been developed that are designed to spray a fluid onto seeds as they are planted or otherwise distributed on and/or within the ground. The spraying system may be incorporated into a planter which distributes the seeds. However, such conventional spraying systems are typically configured to spray a continuous band of fluid down the length of the row in which the seeds are being planted. To avoid the problems associated with continuous band spraying systems, improved spraying systems have been developed that provide for seed-specific placement of agricultural fluids. For example, U.S. Pat. Nos. 7,370,589 and 8,074,585 (Wilkerson et al.), both of which are hereby incorporated by reference in their entirety for all purposes, disclose a system that utilizes a sensor to detect seeds passing through a seed tube. Upon the detection of a seed, the sensor transmits information to a controller configured to control the operation of a fluid dispenser such that the fluid dispenser dispenses fluid onto the seed at a predetermined time after the seed is detected by the sensor.

Some planters include apparatus that actively control the speed of the seeds passing through the seed tube (e.g., using a belt or brush assembly), and allow the planter to travel at a faster speed, i.e., a high-speed planter, while dispensing the seeds at the same frequency as conventional planters. Conventional systems that provide seed-specific placement of agricultural fluids are generally not adapted for use with high-speed planters.

Therefore, there is a need for a spraying system that provides seed-specific placement of fluid for use with a high-speed planter.

BRIEF SUMMARY

In one aspect, a planter system for planting seeds and spraying a fluid is provided. The planter system includes a seeder assembly including a seed tube and a conveyor apparatus configured to propel or carry the seed through the seed tube. The planter system also includes a sensor configured to transmit a detection signal upon detection of the seed passing a detection location. The planter system further includes a nozzle assembly configured to spray the fluid in response to receiving a control signal, and a valve fluidly coupled with the nozzle assembly and configured to control fluid flow therethrough. The planter system also includes a control system communicatively coupled to the sensor and the valve. The control system is configured to determine a travel time of the seed from the detection location to a furrow based on a baseline drop time for the seed, a baseline travel speed of the seeder assembly, and an operating travel speed of the seeder assembly. The control system is also configured to transmit the control signal to the valve based on the travel time and the detection signal to spray the fluid on or adjacent the seed.

In another aspect, a method for planting seeds and spraying a fluid includes dispensing a seed into a seed tube of a seeder assembly, and carrying or propelling the seed through the seed tube. The method also includes detecting the seed passing a detection location and transmitting a detection signal to a control system upon detection of the seed passing the detection location. The method further includes determining a travel time of the seed from the detection location to a furrow. The travel time is determined based on a baseline drop time for the seed, a baseline travel speed of the seeder assembly, and an operating travel speed of the seeder assembly. The method also includes transmitting a control signal from the control system to a valve based on the travel time and the detection signal. The valve is fluidly coupled to a nozzle assembly to control fluid flow therethrough. The method further includes actuating the valve upon receiving the control signal such that fluid is sprayed from the nozzle assembly on or adjacent to the seed.

In yet another aspect, a planter system for planting seeds and spraying a fluid includes a plurality of row units. Each row unit includes a seed tube and a conveyor apparatus configured to propel or carry the seed through the seed tube, and a sensor configured to transmit a detection signal upon detection of the seed passing a detection location. The planter system also includes a control system communicatively coupled to the sensor of each row unit to receive the detection signal from the sensor of each row unit. The control system is configured to determine, for each seeder assembly, a travel time of the seed from the detection location to a furrow based on a baseline drop time for the seed, a baseline travel speed of the seeder assembly, and an operating travel speed of the seeder assembly. The operating travel speed of each seeder assembly is determined based on a location of the seeder assembly relative to a centerline of the planter system and a detected travel speed of the planter system.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Figure 1:
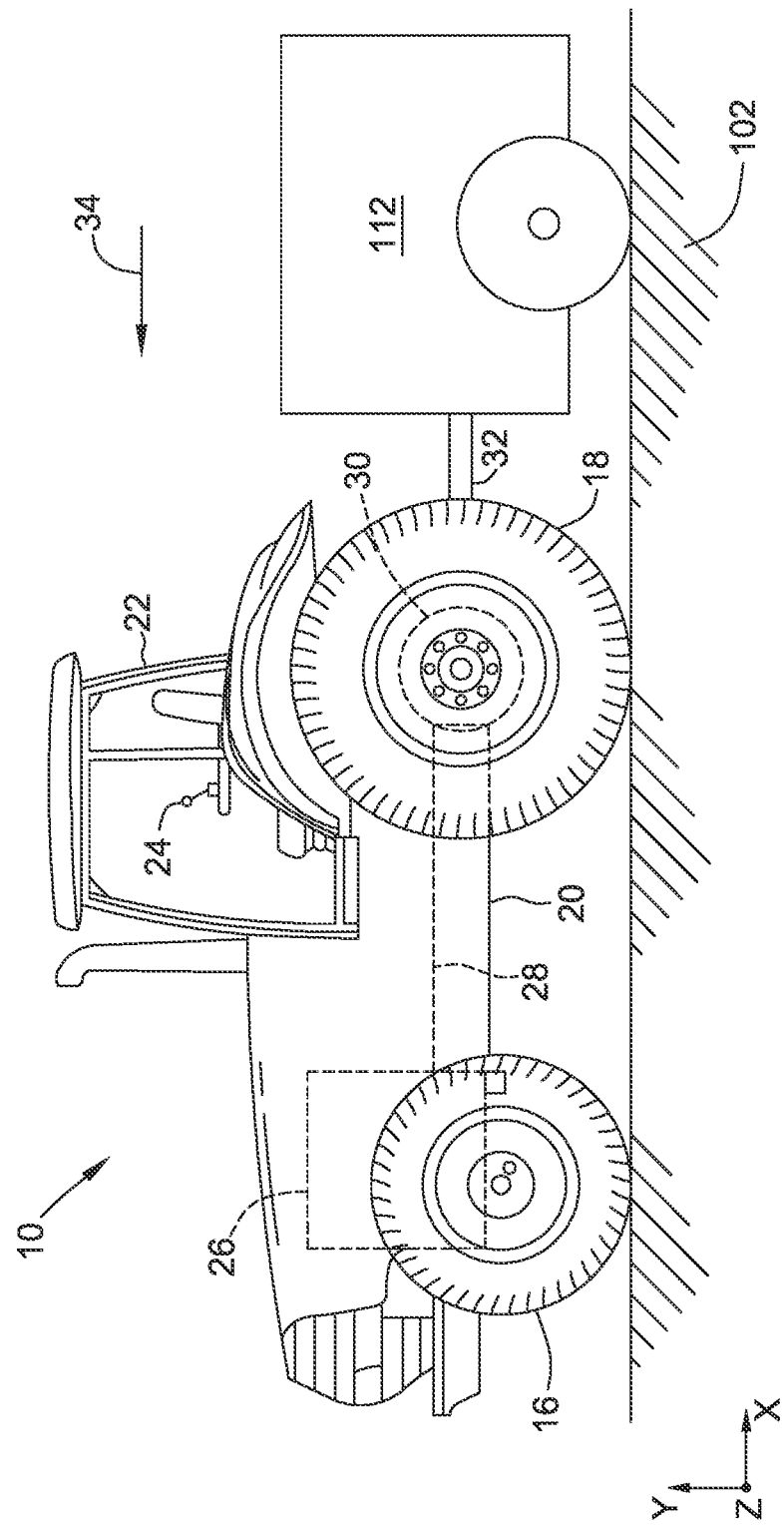
FIG. 1 is a side schematic view of an embodiment of a seed planting and agricultural spraying system connected to a motorized vehicle.
Figure 2:
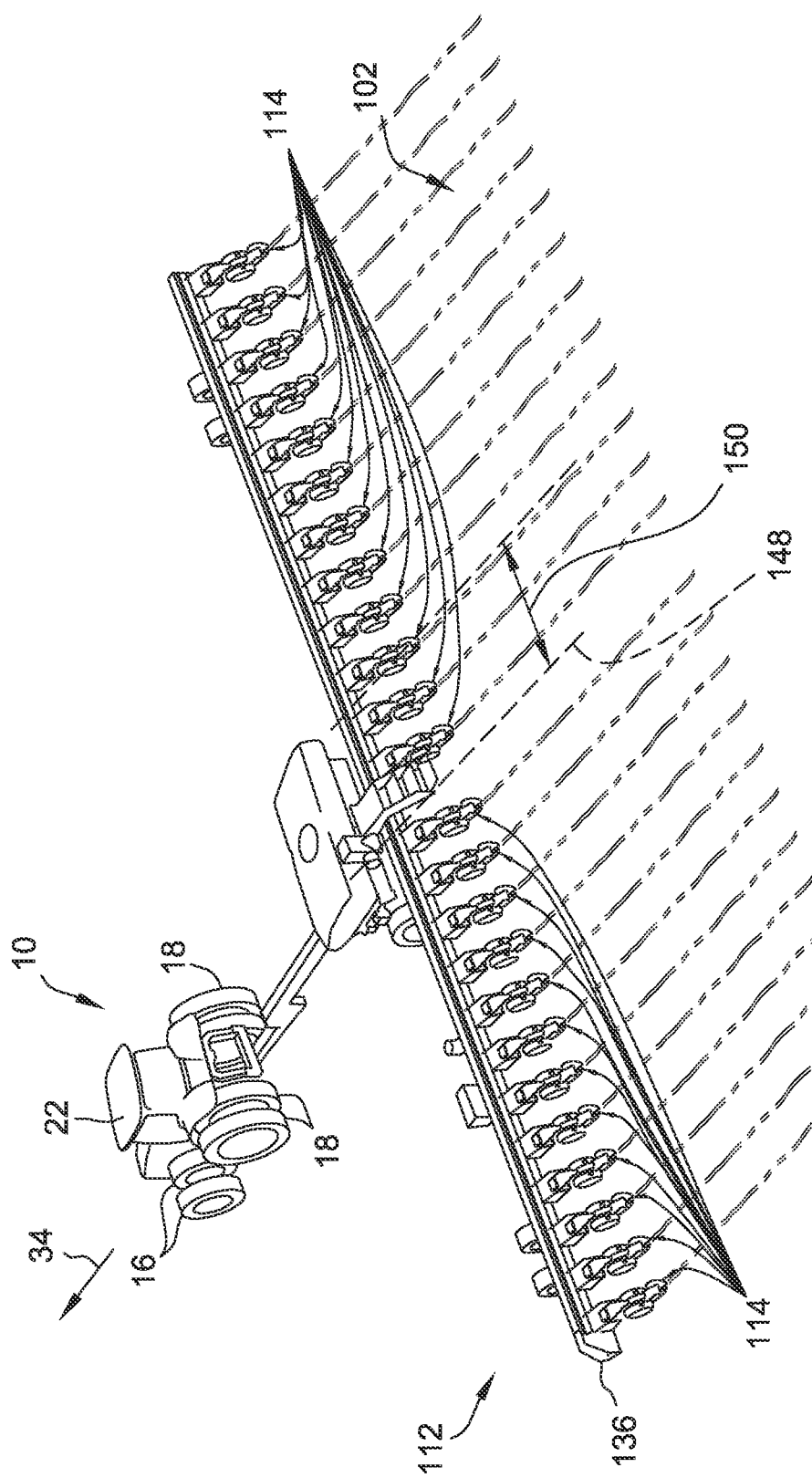
FIG. 2 is a perspective view of the seed planting and agricultural spraying system shown in FIG. 1.

Referring now to FIGS. 1 and 2, a seed planting and agricultural spraying system, or planter, 112 (shown schematically in FIG. 1) is shown connected to a motorized vehicle 10. Motorized vehicle 10 is coupled, fixedly or removably, to seed planting and agricultural spraying system 112 and provides locomotion to seed planting and agricultural spraying system 112 and/or otherwise controls components of seed planting and agricultural spraying system 112. In the illustrated embodiment, motorized vehicle 10 is a tractor, although any other suitable vehicles or machines may be used to provide locomotion to seed planting and agricultural spraying system 112 and provide for control of seed planting and agricultural spraying system 112. In some embodiments, one or more components of seed planting and agricultural spraying system 112 may be incorporated into motorized vehicle 10 without departing from some aspects of this disclosure.

As shown in FIGS. 1 and 2, motorized vehicle 10 includes a pair of front wheels 16, a pair or rear wheels 18, and a chassis 20 coupled to and supported by wheels 16, 18. A cab 22 is supported by a portion of chassis 20 and houses various control devices 24 for permitting an operator to control operation of motorized vehicle 10. In some embodiments, control devices 24 may also permit control of seed planting and agricultural spraying system 112. Motorized vehicle 10 also includes an engine 26 and a transmission 28 mounted on chassis 20. Transmission 28 is operably coupled to engine 26 and provides variably adjusted gear ratios for transferring engine power to wheels 18 via an axle/differential 30. Additionally, as shown in FIGS. 1 and 2, motorized vehicle 10 may be configured to be coupled to seed planting and agricultural spraying system 112 via a suitable coupling 32 such that vehicle 10 may pull seed planting and agricultural spraying system 112 as it moves in a travel direction (indicated by arrow 34) along a field 102. It should be understood that any other suitable vehicle or machine may be used to provide locomotion to seed planting and agricultural spraying system 112 and provide for control of seed planting and agricultural spraying system 112. In some embodiments, for example, vehicle 10 may include tracks instead of or in addition front wheels 16 and/or wheels 18. Additionally, in some embodiments, vehicle 10 may be an autonomous vehicle with or without a cab 22.

Figure 3:
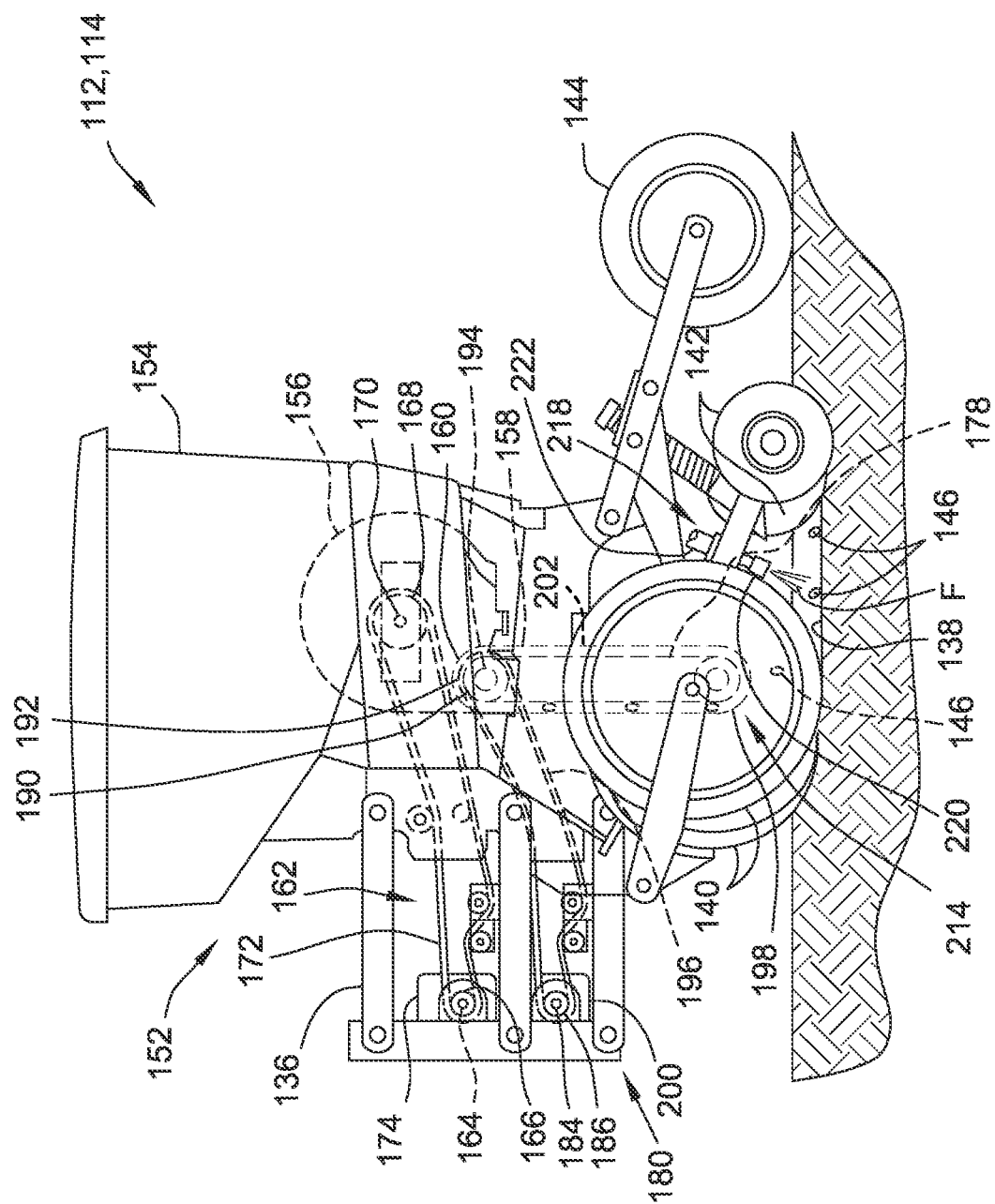
FIG. 3 is a side view of a portion of the seed planting and agricultural spraying system shown in FIG. 1.

Referring to FIGS. 2 and 3, seed planting and agricultural spraying system 112 includes a plurality of row units 114. Row units 114 are configured to at least spray a fluid on and/or adjacent to seeds and/or plants and, in some embodiments, are configured to plant seeds and spray the fluid on and/or adjacent to the seeds. As used herein with reference to fluids, the term "spray" includes not only fluid dispensed in atomized or droplet form, but also any application or dispensing of fluid from an orifice. Seed planting and agricultural spraying system 112 further includes a control system and a user interface (shown in FIGS. 5 and 6) for controlling row units 114 and displaying related information. The control system and user interface determine a spray band length and a position of the spray band relative to a seed, group of seeds, or plant, and convey this information to an operator of the seed planting and agricultural spraying system. The control system and user interface are located in a cab or other occupant space (e.g., cab 22) for the operator of seed planting and agricultural spraying system 112. In alternative embodiments, the control system and/or user interface are located remote from row units 114 and an associated vehicle and allow for remote control of row units 114.

Row unit 114 is configured to create a furrow 138 using a furrow creation device, to meter and dispense seeds into the furrow 138 from a seed hopper 154 using a seed tube 158 and a conveyor apparatus 160, and to spray a fluid F using a nozzle assembly 218. Row unit 114 may include any number of components such that row unit 114 performs these functions for a single row or a plurality of rows simultaneously. For example, in some embodiments, row unit 114 includes a plurality of furrow creation devices, seed tubes 158 fed from seed hoppers 154 (e.g., each seed hopper 154 fed from a single, shared master seed hopper), and nozzle assemblies 218 along the track of row unit 114 and planter 112.

Planter 112 includes a frame 136 extending along the width of planter 112 (e.g., in a direction transverse to the travel of planter 112, in other words parallel to the track length of planter 112) that supports row units 114. Planter 112 has a centerline 148 that extends through the center of frame 136 and in a direction parallel to the travel of planter 112. Row units 114 are spaced equally apart from each other along frame 136 and each row unit 114 has a position relative to centerline 148. In the illustrated embodiment, planter 112 includes an even number of row units 114. The row units 114 are spaced from centerline 148 by distances 150. In alternative embodiments, row units 114 may be arranged in any suitable manner. For example, in some embodiments, planter 112 includes an odd number of row units 114, and one row unit 114 is positioned on frame 136 at centerline 148.

The furrow creation device of planter 112 is configured to create a trench or furrow 138 within the ground for planting seeds 146. In several embodiments, the furrow creation device includes a pair of laterally spaced opening discs 140, a pair of laterally spaced closing discs 142, and a press wheel 144. The opening discs 140 are configured to open a furrow 138 within the ground. Seeds 146 are deposited into furrow 138 (e.g., by seed tube 158), and closing discs 142 are configured to close furrow 138 over seeds 146. Press wheel 144 is configured to compact the soil that has been closed over seeds 146. In alternative embodiments, furrow creation device may include other suitable components for creating furrow 138. In further alternative embodiments, planter 112 does not include a furrow creation device but rather plants and/or sprays in an existing furrow 138 (e.g., created by another machine). In some embodiments, planter 112 sprays on top of the ground outside of a furrow. For example, planter 112 may spray fluid from a front end of planter 112 in the travel direction and/or planter 112 may spray the ground at a specified distance from a furrow.

In the illustrated embodiment, each row unit 114 includes a seeder assembly 152 including seed hopper 154, a seed meter 156, seed tube 158, and a conveyor apparatus 160. As used herein, the term "seed tube" refers to an enclosure through which seeds are delivered or conveyed to a furrow. Seed hopper 154, seed meter 156, seed tube 158, and conveyor apparatus 160 are configured to dispense seeds 146 into furrow 138. For example, seed hopper 154 is any suitable container or other storage device configured for storing and dispensing seeds 146 into seed meter 156. Seed meter 156 is any suitable seed meter configured to dispense seeds 146 into seed tube 158 at a metered rate. In one embodiment, seed meter 156 includes a housing and a seed plate or disc rotatably supported within the housing. The seed disc includes a plurality of indentions, channels and/or other suitable recessed features that are spaced apart from one another around the seed disc (e.g., in a circular array) to allow seeds 146 to be dispensed at a given frequency. Specifically, each recessed feature is configured to grab one seed 146 (e.g., via a vacuum applied to the recessed feature) as such recessed feature is rotated past the location at which seeds 146 are fed into the housing from seed hopper 154. As the seed disc is rotated, seeds 146 are carried by the recessed features and dispensed into seed tube 158. The metered rate may be predetermined, set, changed, or otherwise controlled (e.g., by the control system of planter 112 or mechanically based on a rate of travel of row unit 114). For example, at a given rotational speed for the seed disc, seed meter 156 dispenses seeds 146 at a constant frequency. When planter 112 travels at a constant speed, seeds 146 are spaced apart equally from one another within furrow 138. As the travel speed of planter 112 increases or decreases, the rotational speed of the seed disc may also be increased or decreased to maintain equal spacing or a predetermined spacing of seeds 146 within furrow 138. Such variation of the rotational speed of the seed disc is provided by a drive system 162 and/or controlled by a control system of planter 112.

Drive system 162 is or includes any suitable device and/or combination of devices configured to rotate the seed disc of seed meter 156. In the illustrated embodiment, for example, drive system 162 is a sprocket/chain arrangement including a drive shaft 164, a first sprocket 166 coupled to drive shaft 164, a second sprocket 168 coupled to the seed disc (e.g., via a shaft 170) and a chain 172 coupled between the first and second sprockets 166, 168. Drive shaft 164 is configured to rotate first sprocket 166, which, in turn, rotates second sprocket 168 via chain 172. Rotation of second sprocket 168 results in rotation of shaft 170 and, thus, rotation of the seed disc within the housing of seed meter 156. Drive system 162 further includes a motor 174 (e.g., an electric or hydraulic motor) rotatably coupled to drive shaft 164 that is configured to be controlled by the control system of planter 112. Specifically, the control system is configured to receive signals associated with the travel speed of planter 112 from a speed sensor (e.g., an encoder or shaft sensor, global positioning system receiver, or other device suitable for measuring the speed, directly or indirectly, of planter 112) and regulate the rotational speed of motor 174 based on the travel speed of planter 112 such that a desired spacing between seeds is achieved or maintained. In alternative embodiments, drive system 162 is or includes other components or devices. For example, drive system 162 may be configured to rotate the seed disc using a connection with one or more wheels or other rotating features of planter 112. A transmission, clutch, and/or other components may be used to regulate the rotational speed of the seed disc and therefore achieve or maintain desired spacing between seeds.

Conveyor apparatus 160 includes a brush 176 (shown in FIG. 4), a belt 178 supporting brush 176, and a drive system 180. Brush 176 and belt 178 of conveyor apparatus 160 are positioned within an interior space 208 of seed tube 158 defined by a housing 202 such that bristles 182 of brush 176 contact seeds 146 as seeds 146 pass through the seed tube 158. Brush 176 receives seeds 146 dispensed into seed tube 158 by seed meter 156 and carries seeds 146 along the length of seed tube 158 as belt 178 is rotated by drive system 180. In alternative embodiments, conveyor apparatus 160 includes other components or devices. For example, in several embodiments, conveyor apparatus 160 includes a source of pressurized fluid and is configured to propel seeds 146 through seed tube 158 using the pressurized fluid.

In some embodiments, belt 178 includes flights or cleats instead of or in addition to bristles 182. The flights may be spaced apart along the longitudinal direction of belt 178 and configured to receive seeds 146 at predetermined intervals. The flights may extend outward from the surface of the belt 178 and may be curved, angled, straight, and/or any other shape.

Drive system 180 is or includes any suitable device and/or combination of devices configured to rotate belt 178 of conveyor apparatus 160. In the illustrated embodiment, for example, drive system 180 is a sprocket/chain arrangement including a drive shaft 184, a first sprocket 186 coupled to drive shaft 184, a second sprocket 190 coupled to a first pulley 192 (e.g., via a shaft 194) and a chain 196 coupled between the first and second sprockets 186, 190. Drive shaft 184 is configured to rotate first sprocket 186, which, in turn, rotates second sprocket 190 via chain 196. Rotation of second sprocket 190 results in rotation of shaft 194 and, thus, rotation of first pulley 192 and belt 178, and a second pulley 198 coupled to belt 178. Drive system 180 further includes a motor 200 (e.g., an electric or hydraulic motor) rotatably coupled to drive shaft 184 that is configured to be controlled by the control system of planter 112. Specifically, the control system is configured to receive signals associated with the travel speed of planter 112 from a sensor or other suitable device (e.g., an encoder or shaft sensor, global positioning system receiver, or other device) and regulate the rotational speed of motor 200 based on the travel speed of planter 112 such that a desired spacing between seeds is achieved or maintained. In alternative embodiments, drive system 180 is or includes other components or devices. For example, drive system 180 may be configured to move conveyor apparatus 160 using a connection with one or more wheels or other rotating features of planter 112. A transmission, clutch, and/or other components may be used to regulate the speed of conveyor apparatus 160 and therefore achieve or maintain desired spacing between seeds.

In alternative embodiments, row unit 114 is or includes other suitable components for dispensing seeds 146. In further alternative embodiments, planter 112 does not include seed hopper 154, seed meter 156, seed tube 158, conveyor apparatus 160, or other components for dispensing seeds 146, and instead sprays existing seeds 146 or existing plants. In such embodiments, row unit 114 does not include seeder assembly 152.

Figure 4:
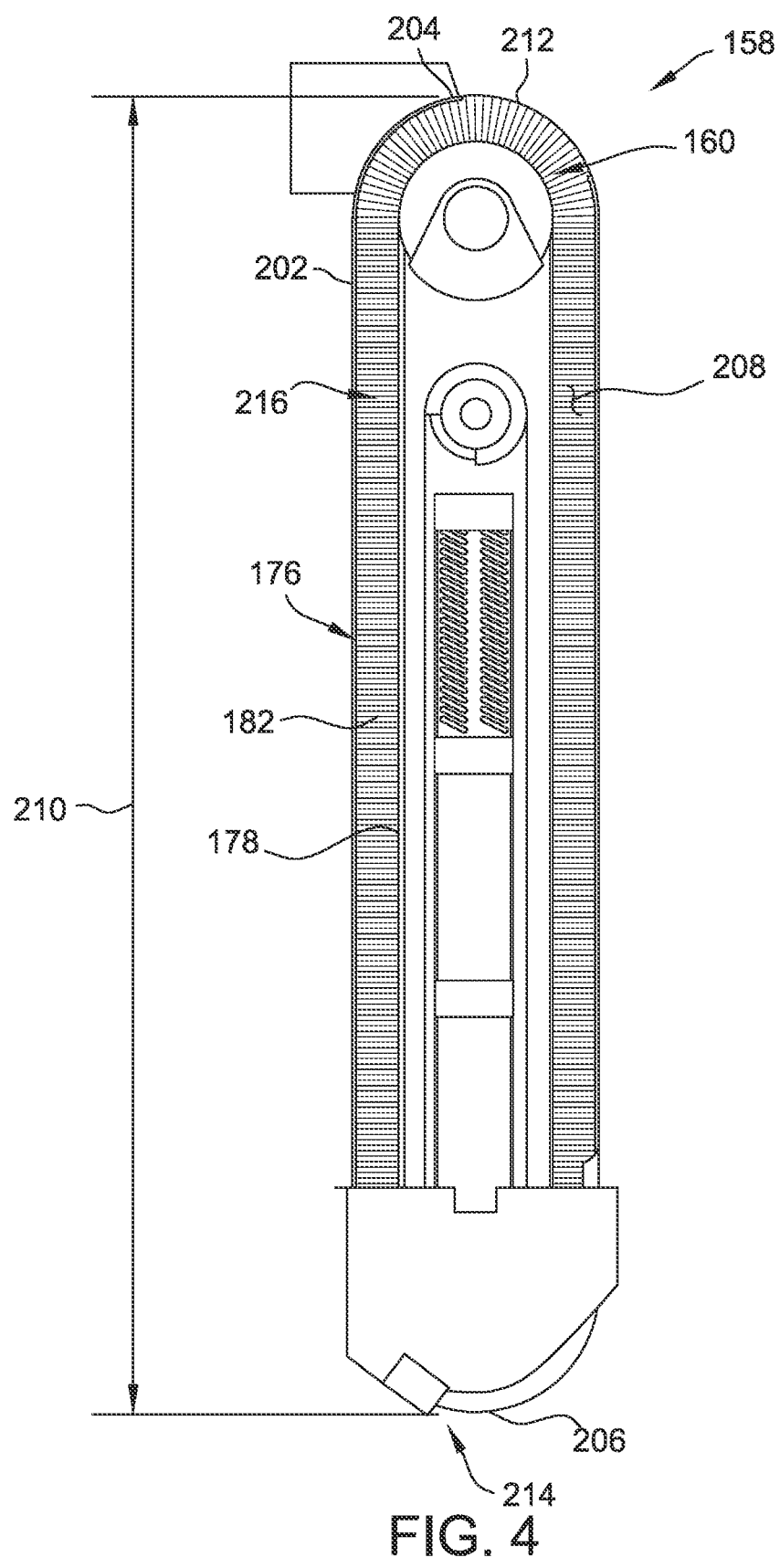
FIG. 4 is a side view of a seed tube of the seed planting and agricultural spraying system shown in FIGS. 1-3, with a portion of the seed tube removed to show a conveyor apparatus configured to carry seeds through the seed tube.

Referring to FIG. 4, housing 202 of seed tube 158 includes a first end 204 and a second end 206, and defines interior space 208. Seed tube 158 has a length 210 defined between first end 204 and second end 206. First end 204 of housing 202 defines an inlet 212 of seed tube 158. Seeds 146 dispensed from seed meter 156 (shown in FIG. 3) enter interior space 208 of housing 202 through inlet 212. Second end 206 of housing 202 defines an outlet 214 of seed tube 158. Seeds 146 exit interior space 208 of housing 202 and are dispensed to furrow 138 (shown in FIG. 3) through outlet 214. During operation of row unit 114, seed tube 158 is oriented substantially vertically such that inlet 212 is at a top of seed tube 158 and outlet 214 is at a bottom of seed tube 158. Accordingly, seeds 146 travel through interior space 208 of housing 202 in a generally downward direction from first end 204 to second end 206.

Together, conveyor apparatus 160 and housing 202 form a chute 216 for seeds 146. Chute 216 extends from inlet 212 to outlet 214. Bristles 182 of brush 176 at least partially obstruct chute 216 such that brush 176 receives seeds 146 dispensed into the chute. Bristles 182 are flexible to allow displacement of bristles 182 around seeds 146 and are sufficiently resilient to prevent movement of seeds 146 relative to brush 176 and belt 178 when seeds 146 are received by brush 176. Accordingly, bristles 182 retain seeds 146 on brush 176 as belt 178 moves brush 176 along chute 216 to carry seeds 146 from inlet 212 to outlet 214 of seed tube 158.

First pulley 192 is positioned adjacent first end 204 of seed tube 158 and is drivingly coupled to drive system 180 (shown in FIG. 3). Second pulley 198 (shown in FIG. 3) is positioned adjacent second end 206 and is rotatably mounted to housing 202. Belt 178 extends around and between first pulley 192 and second pulley 198 such that belt 178 forms a continuous loop around pulleys 192, 198 and extends along substantially the entire length of seed tube 158. Rotation of first pulley 192 causes rotation of belt 178. In alternative embodiments, conveyor apparatus 160 may have other configurations without departing from some aspects of the disclosure. For example, in some embodiments, conveyor apparatus 160 may include chains, rollers, a pressurized fluid, and/or any other suitable conveyor medium.

Figure 5:
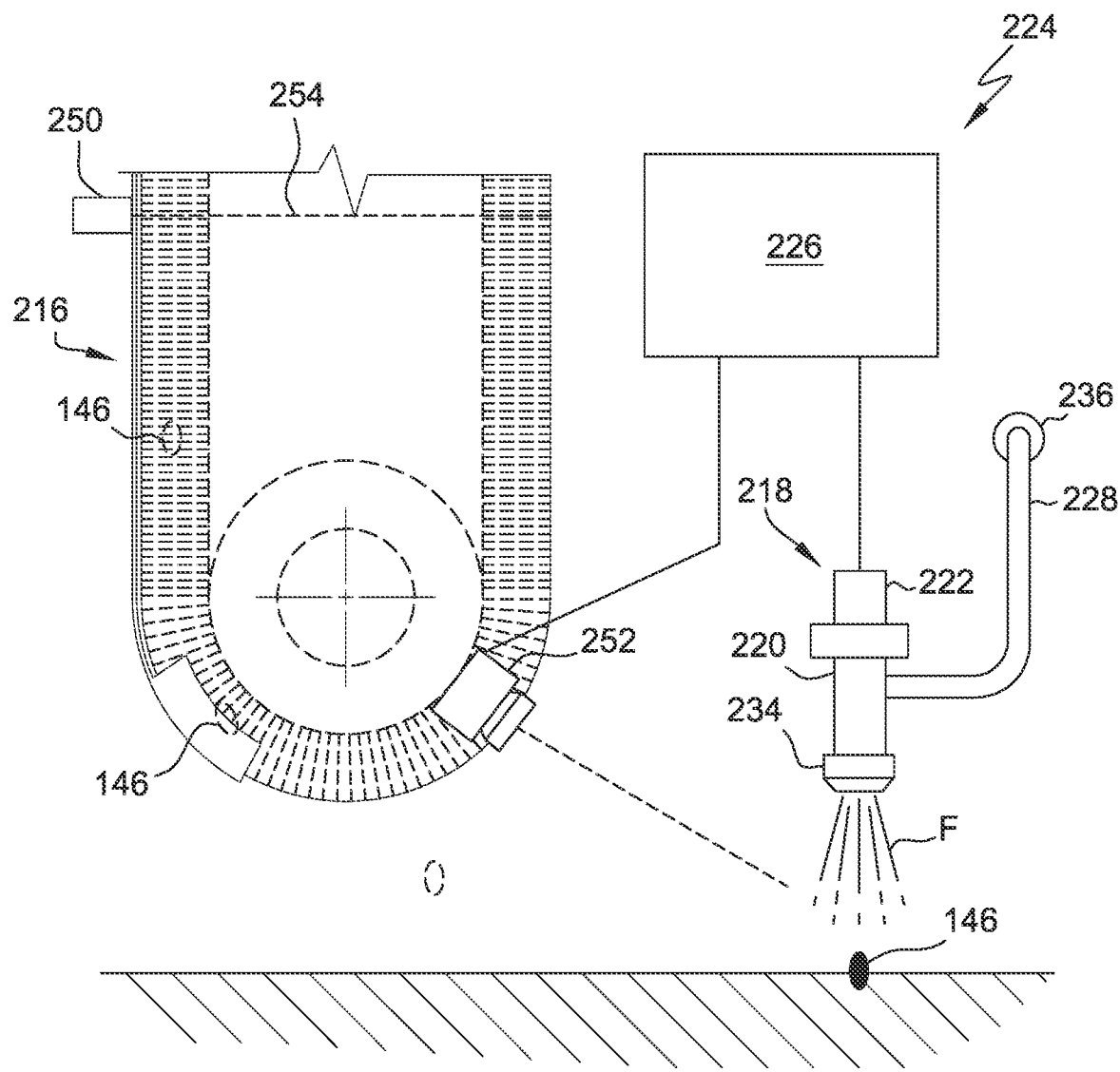
FIG. 5 is schematic view of a portion of the seed planting and agricultural spraying system shown in FIGS. 1-3.

Referring to FIG. 5, row unit 114 further includes at least one nozzle assembly 218 configured to spray fluid F. Nozzle assembly 218 sprays fluid F, or a combination of fluids, on, adjacent to, or otherwise in relation to seeds 146 dispensed by seed tube 158 or existing plants. Nozzle assembly 218 includes a spray nozzle 220 and a valve 222 (e.g., a solenoid valve). Nozzle 220 is any suitable spray nozzle suitable for an agricultural spraying system. Valve 222 is configured to be mounted to and/or integrated within a portion of spray nozzle 220 or nozzle assembly 218 using any suitable mounting configuration and/or any other suitable configuration that permits control of the flow of fluid F through the nozzle 220. For example, valve 222 is a solenoid valve positioned relative to spray nozzle 220 and controlled by the control system of planter 112 such that flow of fluid F through spray nozzle 220 is modified using pulse width modulation (PWM) control of valve 222. In other embodiments, valve 222 may be located remote from nozzle 220. In some embodiments, for example, valve 222 may be mounted or coupled to the conduit or manifold used to supply fluid to nozzle assemblies 218. In some embodiments, nozzle assembly 218 also includes a spray tip 234 (shown in FIG. 5) coupled to spray nozzle 220 and configured to produce a desired spray pattern.

Fluid F is supplied to nozzle assembly 218 from any suitable fluid source (not shown), such as a fluid tank, via a conduit such as a manifold or other suitable flow conduit. In addition, a pump (not shown), such as a centrifugal pump, may be positioned upstream of nozzle assembly 218 for pumping fluid F from the fluid source to the nozzle assembly 218. Alternatively, the pump may be positioned between a fluid reservoir and a manifold which is in fluid communication with a plurality of nozzle assemblies 218. The pump pressurizes the manifold with fluid from the reservoir, and nozzle assembly 218 and/or valve 222 controls flow of the pressurized fluid through spray nozzle 220. In some embodiments, row unit 114 includes a plurality of nozzle assemblies 218 for spraying fluid in parallel rows. In further embodiments, a single nozzle assembly 218 is configured to spray fluid in two or more parallel rows. In still further embodiments, row unit 114 includes a plurality of nozzle assemblies 218 positioned to spray a single row (e.g., furrow). For example, each nozzle assembly 218 may spray a different fluid and may be controlled, by the control system of planter 112, together or individually (e.g., allowing for different spray band lengths and/or offset distances from seeds 146).

As shown in FIG. 5, seed planting and agricultural spraying system 112 further includes a spraying assembly 224 that includes a manifold 236 which supplies fluid F and/or other fluids to nozzle assembly 218. Manifold 236 is coupled to a pump and/or fluid reservoir and is pressurized (e.g., by the pump). Manifold 236 is coupled to nozzle assembly 218 by a suitable fluid conduit 228, such as a pipe or hose. Valve 222 of nozzle assembly 218 controls the flow of fluid F from fluid conduit 228 to nozzle 220 and spray tip 234 as described herein. For example, a controller 226 and/or the control system of planter 112 sends a pulse width modulated signal to a solenoid valve 222 to control flow of fluid F to nozzle 220. Spray tip 234 is configured to produce a specified spray pattern. The spray pattern may be pressure dependent. Controller 226 and/or the control system may be configured to control the pressure in manifold 236 to achieve a desired spray pattern in combination with spray tip 234. In some embodiments, spray tip 234 is interchangeable with other spray tips configured to produce varying spray patterns. In other embodiments, nozzle assembly 218 does not include a spray tip 234. The type of spray tip 234 and/or parameters describing the spray pattern produced by spray tip 234 may be entered into controller 226 and/or the control system by an operator via a user interface, for example, using a tip calibration screen. Other operating parameters, such as fluid flow rate, fluid pressure, seed population, and speed or velocity of the planter 112 or row unit 114, may be determined by and/or input to controller 226 and/or the control system (e.g., by an operator using a user interface). Controller 226 and/or the control system may use this information in determining spray band length of fluid F and/or the offset of the spray band from seeds 146. Spray band length refers to the length of the fluid spray band, measured in the direction of travel of row unit 114 and planter 112, discharged or dispensed by nozzle assembly 218 during a single on-cycle of valve 222.

Still referring to FIG. 5, in some embodiments, spraying assembly 224, including nozzle assembly 218, is configured to spray fluid F on and/or adjacent to seed 146 using, in part, one or more sensors. In the illustrated embodiment, for example, spraying assembly 224 includes a seed sensor 250. Seed sensor 250 is configured to sense, at least, when seed 146 enters, passes through, and/or exits seed tube 158. For example, sensor 250 may be an optical sensor (e.g., a camera) or a beam break sensor (e.g., infrared beam break sensor) producing a beam which when broken sends a signal (e.g., a change in voltage). Seed sensor 250 may be a mechanical sensor which at least partially obstructs seed tube 158 and that produces a signal (e.g., change in voltage) when seed 146 contacts or moves the mechanical sensor. In alternative embodiments, other suitable sensor(s) are used to detect when seed 146 enters and/or exits seed tube 158. In further embodiments, sensor 250 is configured to determine a location of seed 146 in furrow 138. For example, sensor 250 may be or include a camera or acoustic sensor which images or otherwise detects seed 146 in furrow 138. Additionally or alternatively, spraying assembly 224 may include a second sensor, such as a camera 252, configured to capture one or more images of each seed 146 or group of seeds 146 after it is dispensed from seed tube 158 and/or as it is being sprayed by the nozzle assembly(ies) 218. Additional details and operation of seed sensor 250 and camera 252 are described in U.S. Pat. No. 9,763,381, issued Sep. 19, 2017, the disclosure of which is hereby incorporated by reference in its entirety. Using image recognition techniques, distance calculating techniques, and/or a time when seed 146 leaves seed tube 158, the location of seed 146 may be determined. Sensor(s) 250, 252 may send a signal to a controller 226 and/or a control system (shown in FIG. 6) of planter 112 for use in controlling spraying assembly 224, such as when to actuate valve 222 on nozzle assembly 218. For example, the signal may be sent to controller 226 when sensor(s) 250, 252 sense seed 146 passing a detection location 254 or a suitable time after sensor(s) 250, 252 sense seed 146 passing detection location 254. In some embodiments, the time delay for sensor(s) 250, 252 to send the signal may be based on a stored value and/or may be determined based on an operating parameter of planter 112 such as the distance between detection location 254 and outlet 214 of seed tube 158 and/or the number of flights between detection location 254 and outlet 214.

Conventional systems that provide seed-specific placement of agricultural fluids are generally not adapted for use with high-speed planters because such spray systems are not adapted to accurately determine the location or "drop time" of the seeds distributed by the high-speed planters. For example, in a high-speed planter, the time that each seed travels through the seed tube varies based on the travel speed of the planter. In contrast, typical spraying systems for seed-specific placement rely on each seed reaching the ground at a set time after being detected (e.g., based on a free-fall or gravity-based fall of the seed through the seed tube). Such systems do not account for a seed being actively transported or carried through the seed tube, or for variations in the travel time of the seeds through the seed tube based on changes in the travel speed of the planter. Moreover, if the planter includes a plurality of row units, the travel time of the seeds in the seed tube of each row unit may vary based on the position of the row unit relative to a centerline of the high-speed planter.

The systems and methods described herein facilitate seed-specific placement of fluid in high-speed planter systems, for example, by providing suitable techniques and algorithms for determining when to actuate the valve in a spraying assembly in a high-speed planter. For example, controller 226 and/or the control system of planter 112 use information received from sensor(s) 250, 252 and/or determined or received operating parameters of planter 112 to control spraying assembly 224. For example, controller 226 and/or the control system of planter 112 may be configured to determine when to open and close valve 222 by analyzing various operating parameters of planter 112, which may be pre-stored within the controller's memory and/or received by the controller 226 and/or control system as an input. For example, operating parameters may include, but are not limited to, the vertical distance from inlet 212 of seed tube 158 to sensor 250, the vertical distance between sensor 250 and furrow 138, the vertical distance between an outlet of nozzle assembly 218 (e.g., spray tip 234, if connected) and furrow 138, a horizontal distance between outlet 214 of seed tube 158 and an outlet of nozzle assembly 218, an angle at which nozzle assembly 218 is oriented relative to field 102, the speed of row unit 114, the number of flights on belt 178, and/or any other suitable operating parameters. Based on such analysis, controller 226 and/or the control system may be configured to calculate a suitable time delay for actuating valve 222 (e.g., the amount of time between when the sensor 250 detects a seed 146 and when valve 222 is opened to spray fluid F on and/or adjacent to each seed 146). As described further herein for example, controller 226 and/or the control system of planter 112 is configured to send a control signal to nozzle assembly 218 to spray fluid F on or adjacent to seed 146 based, in part, on a determined drop or travel time of seed 146. Controller 226 determines the drop time of seed 146, i.e., the time required for seed 146 to move from the detection location 254 to furrow 138, based on a baseline drop time for the seed, a baseline travel speed of the seeder assembly, and an operating travel speed of the seeder assembly.

Controller 226 and/or the control system of planter 112 may additionally or alternatively be configured to control the operation of valve 222 such that a specific volume of fluid F is applied on and/or adjacent to each seed 146. Controller 226 and/or the control system may be configured to analyze one or more operating parameters in order to determine the duration of a valve pulse (e.g., the amount of time valve 222 is opened) to achieve a desired spray volume for each seed 146. Such operating parameters may include, but are not limited to, the pressure of the fluid F supplied to valve 222, the configuration of valve 222 (e.g., the sizes of the inlet and/or outlet of the valve 222), the configuration of nozzle assembly 218 (e.g., spray tip 234 orifice size), the speed V of row unit 114 and/or any other suitable operating parameters. Controller 226 and/or the control system may be configured to control the duration of the valve pulse in a manner that allows the same volume of fluid F to be sprayed on and/or adjacent to each seed 146.

Controller 226 and/or the control system of planter 112 may also or alternatively be configured to control the operation of valve 222 such that fluid F is applied beginning at a specific offset distance from seed 146, an existing plant, or other target. For example, the offset distance may be measured from seed 146 extending in the direction of travel of row unit 114 and planter 112. An offset distance of 0 results in fluid F being applied substantially at seed 146 with fluid extending a spray band length in the direction of travel. An offset distance of greater than 0 results in an offset between seed 146 and the point at which fluid F is applied, such that a gap exists between seed 146 and fluid F, with fluid F extending from the end of the gap and in the direction of travel. An offset distance of less than 0 results in a negative offset such that fluid F is applied starting before seed 146, continuing on or under seed 146, and extending from seed 146 in the direction of travel. The offset distance may be provided to controller 226 and/or the control system from an operator via a user interface (shown in FIGS. 4 and 5). Controller 226 and/or the control system may be configured to control the timing of the valve pulse sent to valve 222 such that valve 222 opens and closes at a time that generates the offset of fluid F described herein.

Alternatively, controller 226 and/or the control system may be configured to implement a fixed application approach, wherein valve 222 is operated at a constant pulse duration. In such an embodiment, the specific volume of fluid F applied on and/or adjacent to each seed 146 may generally vary depending on the speed V of row unit 114 and/or the pressure of the fluid F supplied to valve 222.

Figure 6:
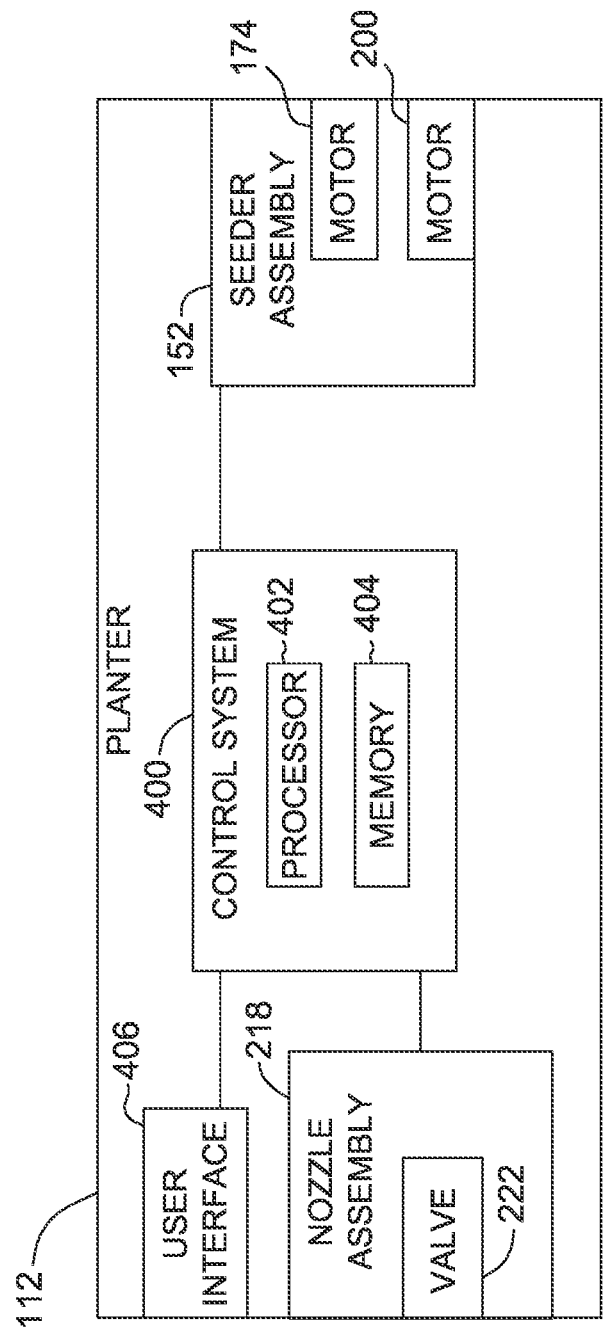
FIG. 6 is a block diagram of the seed planting and agricultural spraying system shown in FIGS. 1-3.

Controller 226 and/or the control system of planter 112 may display the spray band length of fluid F and/or the position of the spray band relative to seeds 146 to the operator of planter 112 using a user interface (shown in FIG. 6). Based on this information, the operator may be able to manually adjust the settings of the spraying assembly 224 and/or planter 112 to achieve desired spray characteristics, such as a desired spray band length and/or a desired spacing between the spray band and a seed 146, plant, or other target ahead of or behind the spray band relative to the direction of travel of row unit 114 and planter 112. For example, an operator may adjust, using the control system, the pressure and/or flow rate of the fluid F supplied to the valve 222, the duration of the valve 222 pulse (e.g., the amount of time valve 222 is open for each spray), the volume of fluid F being sprayed and/or any other suitable operating parameter. The operator may further adjust other settings and/or parameters such as the speed of planter 112 to adjust the spray band length of fluid F and/or the offset of the spray band from seeds 146. In some embodiments, controller 226 and/or the control system of planter 112 displays images, captured by sensors 250 and/or 252, of seeds 146 and the spraying of fluid F to an operator of planter 112 allowing for further adjustment of spraying assembly 224 and/or other systems.

Moreover, in one embodiment, controller 226 and/or the control system may also be configured to control a flow rate of fluid F supplied to valve 222 by controlling the operation of a suitable flow regulating valve. For example, controller 226 and/or the control system may be configured to determine the flow rate of the fluid F supplied through the fluid conduit 228 based on inputs received from one or more suitable meters and/or sensors positioned upstream of valve 222, such as one or more turbine meters associated with a pump supplying manifold 236, one or more tank level meters associated with a fluid source or reservoir supplying manifold 236, one or more flow meters associated with fluid conduit 228, one or more pressure sensors and/or other sensors. In addition, controller 226 and/or the control system may also be configured to receive operator inputs, from a user interface, corresponding to a desired flow rate for spraying assembly 224. Accordingly, based on such inputs, the controller 226 and/or the control system may be configured to control the operation of the flow regulating valve so as to maintain fluid F supplied to valve 222 at the desired flow rate. Controller 226 and/or the control system of planter 112 may further use these inputs to determine the spray band length of fluid F sprayed by spraying assembly 224.

Further, in one embodiment, controller 226 and/or the control system may also be configured to control the pressure of fluid F supplied to valve 222. For example, one or more pressure sensors may be configured to monitor the pressure of fluid F and transmit pressure measurements to controller 226 and/or the control system. Controller 226 and/or the control system may, in turn, be configured to pulse valve 222 at a suitable frequency and/or duty cycle in order to maintain a specific pressure upstream of valve 222, such as within fluid conduit 228 or manifold 236. Such pressure based control may allow controller 226 and/or the control system to vary the amount of fluid F being sprayed on and/or adjacent to each seed 146 while operating valve 222 at a constant pulse duration.

Referring now to FIGS. 5 and 6, in some embodiments, controller 226 is implemented as part of control system 400 of planter 112 and is not a standalone controller. In alternative embodiments, controller 226 is in communication with control system 400 of planter 112 (e.g., via a data bus). Controller 226 and/or control system 400 may generally be or include any suitable computer and/or other processing unit, including any suitable combination of computers, processing units and/or the like that may be operated independently or in connection within one another. Controller 226 and/or control system 400 may include one or more processor(s) 402 and associated memory device(s) 404 configured to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, the memory device(s) 404 of controller 226 and/or control system 400 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s), configure or cause controller 226 and/or control system 400 to perform various functions described herein including, but not limited to, controlling seeder assembly 152 (shown in FIG. 3), controlling the operation of valve 222, calculating time delays for valve 222, controlling a flow rate of the fluid F supplied to valve 222, controlling the pressure of the fluid F supplied to valve 222, determining a spray band length of fluid F, determining a position of the spray band of fluid F (e.g., the coverage on the ground) relative to seeds 146, receiving inputs from user interface 406, providing output to an operator via user interface 406, receiving data from sensor(s) 250, and/or various other suitable computer-implemented functions.

FIG. 6 shows a block diagram of planter 112 according to one embodiment. Control system 400 of planter 112 is coupled to seeder assembly 152, user interface 406, and nozzle assembly 218. Control system 400 is configured to control these and/or other components to perform the functions described herein. Seeder assembly 152 includes motor 174 and motor 200 as described with reference to FIG. 3. Control system 400 controls motor 174 and motor 200 by outputting suitable motor control signals to control the rate at which seeds 146 (shown in FIG. 5) are dispensed and/or otherwise controls seeder assembly 152 to perform the functions described herein. Control system 400 further controls nozzle assembly 218 to perform the functions described herein such as controlling when fluid F (shown in FIG. 5) is sprayed, controlling for what length of time fluid F is sprayed, and/or other functions of nozzle assembly 218 described herein. For example, control system 400 controls valve 222 using pulse width modulation as described herein.

Control system 400 includes processor 402 and memory 404. As described above, processor 402 and memory 404 are configured to cause control system 400 to perform the functions described herein. For example, memory 404 may include programs, instructions, formulas, look up tables, databases, and/or other information which, when executed or otherwise utilized by processor 402, cause performance of the functions of planter 112 and/or row unit 114 described herein.

User interface 406 is configured to receive information from an operator and to provide information to the operator. For example, and without limitation, user interface 406 may include input devices including a keyboard, mouse, touchscreen, joystick(s), throttle(s), buttons, switches, and/or other input devices. For example, and without limitation, user interface may include output devices including a display (e.g., a liquid crystal display (LCD), or an organic light emitting diode (OLED) display), speakers, indicator lights, instruments, and/or other output devices. Control system 400 uses information stored in memory 404 to generate a user interface display and to receive information from the operator and display information to the operator.

Control system 400 is configured to receive information from user interface 406 including fluid volume information, seed volume information, main pressure information, speed information, and distance from seed information. Fluid volume information is information that control system 400 uses to determine the volume of fluid F to be sprayed on or adjacent to each seed, plant, or other target (e.g., using one or more of the techniques described herein). For example, fluid volume information includes a seed population in thousands of seeds per acre, a number of rows to be sprayed, planter width in inches or centimeters, an application rate in gallons per acre or liters per hectare, and/or other information. Seed volume information is information that control system 400 uses to determine the distance between seeds 146. For example, seed volume information includes a seed population in thousands of seeds per acre or per hectare, a number of rows to be sprayed, planter width in inches or centimeters, and/or other information. Main pressure information is information that describes, or is used by control system 400 to determine, a pressure at which fluid F is supplied to nozzle assembly 218 (shown in FIGS. 3 and 5). For example, main pressure information includes a pressure in pounds per square inch or newtons per square meter of fluid F in manifold 236 (shown in FIG. 5) that supplies nozzle assembly 218. Speed information is information that describes the speed of row unit 114 and/or planter 112. For example, speed information is a speed in miles per hour. Distance from seed (e.g., offset) information is information that specifies a distance between fluid F as applied and seed 146. For example, distance from seed information is in inches or centimeters. Distance from seed or offset distance information is used by control system 400 to determine the distance between fluid F, as applied, and seed 146. Control system 400 may also use this information to control nozzle assembly 218 to spray fluid F such that fluid F, as applied, is offset from seed 146 by the specified distance (e.g., using one or more of the techniques described herein).

Control system 400 is configured to display information to an operator using user interface 406. The information displayed may include fluid squirt length and fluid position relative to at least one seed 146, plant or other target. The information displayed may also include volume information, main pressure information, speed information, and distance from seed information. Control system 400 may also determine a distance between seeds 146 in a single furrow 138 (shown in FIG. 5). Control system 400 determines the distance between seeds 146 based on the population of seeds, number of rows, and the planter width. For example, control system 400 determines the quotient of the number of seeds and the number of rows (e.g., determined based on the planter width). The distance between seeds 146, e.g., the seed spacing, is a function of seed population and row spacing.

Figure 7:
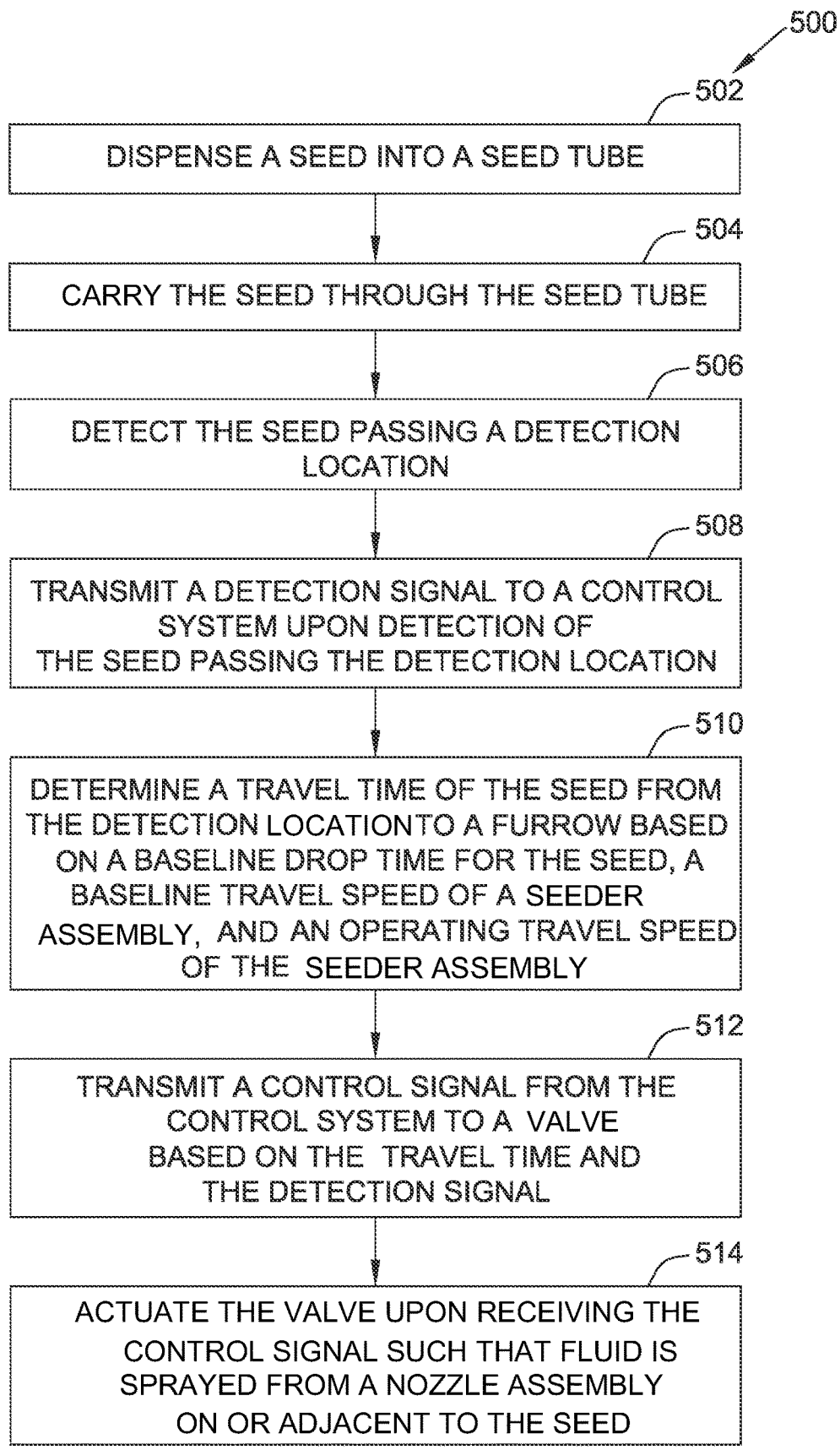
FIG. 7 is a flow chart of a method of planting seeds and dispensing fluid relative to the seeds.

FIG. 7 shows an exemplary process 500 for planting seeds 146 (shown in FIG. 5) and spraying fluid F (shown in FIG. 5). Referring to FIGS. 1-5 and 7, seed meter 156 dispenses 502 seed 146 into seed tube 158, and conveyor apparatus 160 conveys or carries 504 seed 146 through seed tube 158. For example, seed meter 156 dispenses 502 seed 146 through inlet 212 of seed tube 158 and toward brush 176. Brush 176 of conveyor apparatus 160 contacts seed 146 within seed tube 158 and conveys or carries seed 146 through seed tube 158 from first end 204 to second end 206 at a predetermined speed. Belt 178 and brush 176 are driven by drive motor 200 to carry seed 146 through seed tube 158.

Control system 400 determines the speed that conveyor apparatus 160 carries seed 146 through seed tube 158 based on the speed that row unit 114 travels through the field. Accordingly, the speed of conveyor apparatus 160 changes when row unit 114 changes speeds. In addition, the relative speed of row units 114 may be different based on their location relative to centerline 148 of seed planting and agricultural spraying system 112. Accordingly, each conveyor apparatus 160 may carry 504 seed 146 at a speed selected based on the location of row unit 114 relative to centerline 148 of planter 112 and a detected speed of planter 112.

In the exemplary embodiment, after seed 146 has been dispensed by seed meter 156, sensor 250 detects 506 seed 146 passing a detection location 254, and transmits 508 a detection signal to control system 400 upon detection of seed 146 passing detection location 254. Sensor 250 may detect seed 146 before seed 146 enters seed tube 158, as seed 146 passes through seed tube 158, and/or after seed 146 exits seed tube 158. In the illustrated embodiment, sensor 250 detects seed 146 as it passes through seed tube 158, and detection location 254 is between first end 204 and second end 206 of seed tube 158. Conveyor apparatus 160 receives seed 146 at inlet 212 and carries seed 146 through detection location 254. In alternative embodiments, sensor 250 detects 506 seed 146 before seed 146 enters seed tube 158 such that seed 146 is not carried by conveyor apparatus 160 at detection location 254. After exiting outlet 214 of seed tube 158, seed 146 is deposited to furrow 138.

Control system 400 determines 510 a travel time of seed 146 from detection location 254 to furrow 138. The travel time may be determined based on a baseline drop time for seed 146, a baseline travel speed of seeder assembly 152, and an operating travel speed of seeder assembly 152. The baseline drop time for seed 146 may be determined based on a baseline or model row unit 114 with a gravity-fed seed tube (i.e., without conveyor apparatus 160). In the model without conveyor apparatus 160, seed 146 is allowed to free fall through seed tube 158, and the velocity of seed 146 is due to the force of gravity. Accordingly, the baseline drop time is calculated based on the gravitational acceleration constant (9.8 meters per second squared, or 32.2 feet per second squared), release height of seed 146, and the height of detection location 254. The release height of seed 146 is the distance between inlet 212 of seed tube 158 and furrow 138. The height of detection location 254 is the distance between detection location 254 and furrow 138. For example, the baseline drop time may be calculated using the equation:

$$t = \frac{\sqrt{(2 \times g \times H_R)} - \sqrt{(2 \times g \times \Delta H)}}{g}$$

where t represents the drop time in seconds, g represents the gravitational acceleration constant (9.8 meters per second squared, or 32.2 feet per second squared), HR represents the release height of seed 146 in meters or feet, and ΔH represents the difference between the release height of seed 146 and the height of detection location 254 in meters or feet. Using the above equation or other drop time equations known in the art, control system 400 may determine a baseline drop time of seed 146 (i.e., a free-fall or gravity-based drop time), which can be used to determine 510 a travel time of seed 146 from detection location 254 to furrow 138 as described further herein.

Control system 400 is configured to automatically adjust the speed at which seed 146 is carried by conveyor apparatus 160 when the speed of seed planting and agricultural spraying system 112 changes, i.e., when seed planting and agricultural spraying system 112 slows down or speeds up. Control system 400 determines the speed at which seed 146 is carried by conveyor apparatus 160 based on the speed of seed planting and agricultural spraying system 112. For example, the speed at which seed 146 is carried by conveyor apparatus 160 may be calculated using the operating speed of seed planting and agricultural spraying system 112 and a value and/or algorithm stored on memory 404 of control system 400. Accordingly, the speed at which seed 146 is carried by conveyor apparatus 160 varies in accordance with changes in travel speed of seed planting and agricultural spraying system 112. In contrast, in a system including row unit 114 with a gravity-fed seed tube (i.e., without conveyor apparatus 160), the drop time of seeds 146 is the same regardless of the travel speed of seed planting and agricultural spraying system 112. In the illustrated embodiment, conveyor apparatus 160 allows seed planting and agricultural spraying system 112 to travel at faster speeds in comparison to systems with a gravity-fed seed tube because the application rate of seeds 146 is not limited by the gravity-fed drop time of seeds 146, i.e., seed planting and agricultural spraying system 112 is able to travel at speeds in which the time spacing between seeds 146 dispensed by row unit 114 is less than the drop time of seeds 146 dispensed through gravity-fed seeds tubes.

The baseline travel speed of row unit 114 is determined as the speed at which the drop time of seed 146 carried by conveyor apparatus 160 is equal to the baseline drop time for seed 146. For speeds of row unit 114 that are faster than the baseline travel speed, the drop time of seeds 146 carried by conveyor apparatus 160 will be less than the baseline drop time. For speeds of row unit 114 that are slower than the baseline travel speed, the drop time of seeds 146 carried by conveyor apparatus 160 will be greater than the baseline drop time. The baseline travel speed may be determined based on operational parameters of row unit 114 and empirical data or observations from field testing of row units 114. For example, the drop times of seeds 146 may be measured and compared for a range of travel speeds of one or more row units 114 including conveyor apparatus 160 and/or one or more row units 114 including a gravity-fed seed tube. The baseline travel speed may be determined based on the measured values and/or extrapolated values. For example, the baseline travel speed of row unit 114 may be determined by identifying the travel speed of row unit 114 at which the drop time of seeds 146 of row units 114 including conveyor apparatus 160 is equal to the drop time for seeds 146 of row units 114 including the gravity-fed seed tube, i.e., the baseline drop time. The baseline travel speed may be stored in memory 404 and control system 400 may retrieve the baseline travel speed from memory 404 to determine the travel time of seed 146. In alternative embodiments, the baseline travel speed of row unit 114 may be determined and/or updated based on operating parameters of seed planting and agricultural spraying system 112 determined during operation of seed planting and agricultural spraying system 112.

Control system 400 may determine or receive a scalar value for a specific planter 112 based on the baseline drop time and the baseline travel speed. For example, the scalar value may be the product of the baseline drop time and the baseline travel speed. The scalar value may be provided to and/or stored on a memory 404 of control system 400. Control system 400 may use the scalar value to simplify calculations of the drop time by allowing control system 400 to skip determining and/or retrieving the baseline drop time and the baseline travel speed each time a drop time is calculated.

The "operating" travel speed of row unit 114 refers to the speed of row unit 114 (e.g., along travel direction 34) during operation of seed planting and agricultural spraying system 112 (i.e., while seed planting and agricultural spraying system 112 is traveling across a field). Control system 400 receives information relating to the speed of seed planting and agricultural spraying system 112 and determines the operating travel speed of row unit 114 based on the speed of seed planting and agricultural spraying system 112. For example, the speed information may be a speed provided by a global positioning system (GPS) or other speed sensor. In addition, control system 400 may receive information from an operator that allows control system 400 to determine the relative speed of row unit 114 based on the speed information. The operator information may include a number of row units 114 of the system, a width of each row unit 114, and/or the location of a speed sensor relative to row unit 114. Based on the operator information, control system 400 is able to identify centerline 148 of planter 112, determine the position of a speed sensor relative to centerline 148, and/or determine the position of each row unit 114 relative to centerline 148. Control system 400 relates row units 114 to the received speed information and determines the individual travel speeds of row units 114 based on the received and determined information. In some embodiments, one or more of row units 114 may include a sensor that detects the speed of the respective row unit 114 and provides information to control system 400.

Control system 400 determines 510 the drop time, i.e., the travel time of seed 146 from detection location 254 to furrow 138, by calculating the quotient of the scalar value and the travel speed of row unit 114. As a result, control system 400 is able to accurately determine individual drop times for each row unit 114 even when seeds 146 are conveyed through seed tubes 158 at different rates.

Planter 112 transmits 512 a control signal from control system 400 to valve 222 based on the travel time and the detection signal received from sensor 250. For example, as described herein, controller 226 and/or the control system of planter 112 may send a pulse width modulated signal to a solenoid valve 222 to control flow of fluid F to nozzle 220. Also as described herein, the control signal may be varied based on various operating parameters of planter 112 and/or operator inputs including, for example without limitation, the vertical distance between inlet 212 of seed tube 158 and furrow 138, the vertical distance between the sensor 250 and the furrow 138, the vertical distance between an outlet of nozzle assembly 218 (e.g., spray tip 234, if connected) and furrow 138, a horizontal distance between outlet 214 of seed tube 158 and an outlet of nozzle assembly 218, an angle at which nozzle assembly 218 is oriented relative to field 102, and the speed of row unit 114.

Based on at least the volume information, main pressure information, and speed information, control system 400 calculates, or otherwise determines, a fluid squirt length of fluid F (e.g., the length of fluid F as applied to the ground). For example, control system 400 determines a volume of fluid F to be applied per seed 146 by calculating the quotient of the volume of fluid F per acre and the number of seeds 146 per acre. Control system 400 calculates the time valve 222 (shown in FIG. 5) remains open to dispense the volume of fluid F per seed 146 based on the volume of fluid F per seed, the main pressure, and the known geometry and/or other characteristics of spray tip 234 or nozzle 220 (e.g., the area of the opening of spray tip 234, length and friction loss of spray tip 234, and/or other information). Control system 400 then calculates the spray band length (e.g., squirt length) based on the time valve 222 remains open and the speed information (e.g., velocity of row unit 114 and/or planter 112).

Planter 112 actuates 514 valve 222 upon receiving the control signal such that fluid F is sprayed from nozzle assembly 218 on or adjacent to seed 146. Planter 112 is configured to provide a single discrete spray, i.e., a single shot, per seed 146. In alternative embodiments, planter 112 may provide more than one spray per seed 146. In further embodiments, a single spray provided by planter 112 may be associated with two or more seeds 146, e.g., a group of seeds.

Although seed planting and agricultural spraying system 112 is described herein with reference to spraying seeds 146, planter 112 may generally be utilized to spray any suitable type of plant and/or plant precursor, such as seeds, seedlings, transplants, encapsulated tissue cultures and/or any other suitable plant precursors.

Embodiments of the methods and systems described may more efficiently apply fluids to seeds, plants, or other targets as compared to prior methods and systems. For example, the systems and methods described provide for precise placement of a spray relative to a seed that is dispensed by a high-speed planter.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A planter system for planting seeds and spraying a fluid, the planter system comprising:
   a seeder assembly including:
      a seed tube;
      a conveyor apparatus including a source of pressurized fluid, wherein the conveyor apparatus is configured to propel the seed through the seed tube using the pressurized fluid;
   a sensor configured to transmit a detection signal upon detection of the seed passing a detection location;
   a nozzle assembly configured to spray the fluid in response to receiving a control signal;
   a valve fluidly coupled with the nozzle assembly and configured to control fluid flow therethrough; and
   a control system communicatively coupled to the sensor and the valve, wherein the control system is configured to:
      determine a travel time of the seed from the detection location to a furrow based on a baseline drop time for the seed, a baseline travel speed of the seeder assembly, and an operating travel speed of the seeder assembly; and
      transmit the control signal to the valve based on the travel time and the detection signal to spray the fluid on or adjacent the seed.

2. The planter system of claim 1, wherein the control system is configured to calculate a quotient of the baseline travel speed and the operating travel speed.

3. The planter system of claim 2, wherein the control system is further configured to calculate the product of the baseline drop time and the quotient of the baseline travel speed and the operating travel speed to determine the travel time of the seed from the detection location to the furrow.

4. The planter system of claim 1, wherein the sensor is located within or adjacent to the seed tube to detect the seed passing through the seed tube between a first end and a second end of the seed tube.

5. A method for planting seeds and spraying fluid using a planter system including at least one seeder assembly, the method comprising:
   dispensing a seed into a seed tube of the seeder assembly;
   propelling the seed through the seed tube using a pressurized fluid;
   detecting the seed passing a detection location;
   transmitting a detection signal to a control system upon detection of the seed passing the detection location;
   determining a travel time of the seed from the detection location to a furrow based on a baseline drop time for the seed, a baseline travel speed of the seeder assembly, and an operating travel speed of the seeder assembly;
   transmitting a control signal from the control system to a valve based on the travel time and the detection signal, wherein the valve is fluidly coupled to a nozzle assembly to control fluid flow therethrough; and
   actuating the valve upon receiving the control signal such that fluid is sprayed from the nozzle assembly on or adjacent to the seed.

6. The method of claim 5, wherein determining the travel time of the seed from the detection location to the furrow comprises calculating a quotient of the baseline travel speed and the operating travel speed.

7. The method of claim 6, wherein determining the travel time of the seed from the detection location to the furrow further comprises calculating the product of the baseline drop time and the quotient of the baseline travel speed and the operating travel speed.

8. The method of claim 6 further comprising determining the operating travel speed of the seeder assembly based on a detected travel speed of the planter system and a location of the seeder assembly relative to a centerline of the planter system.

9. The method of claim 6, wherein detecting the seed passing through the seed tube comprises detecting the seed passing through the seed tube using a sensor positioned adjacent or within the seed tube between an inlet and an outlet of the seed tube.

10. A planter system for planting seeds and spraying a fluid, the planter system comprising:
  a plurality of row units, each row unit including:
    a seed tube;
    a conveyor apparatus including a source of pressurized fluid, wherein the conveyor apparatus is configured to propel the seed through the seed tube using the pressurized fluid; and
    a sensor configured to transmit a detection signal upon detection of the seed passing a detection location; and
  a control system communicatively coupled to the sensor of each row unit to receive the detection signal from the sensor of each row unit, wherein the control system is configured to determine, for each seeder assembly, a travel time of the seed from the detection location to a furrow based on a baseline drop time for the seed, a baseline travel speed of the seeder assembly, and an operating travel speed of the seeder assembly, wherein the operating travel speed of each seeder assembly is determined based on a location of the seeder assembly relative to a centerline of the planter system and a detected travel speed of the planter system.

11. The planter system of claim 10, wherein the control system is configured to calculate a quotient of the baseline travel speed and the operating travel speed.

12. The planter system of claim 11, wherein the control system is further configured to calculate the product of the baseline drop time and the quotient of the baseline travel speed and the operating travel speed to determine the travel time of the seed from the detection location to the furrow.

* * * * *